(12) United States Patent  
Durairaj et al.

(10) Patent No.: US 11,556,134 B1  
(45) Date of Patent: Jan. 17, 2023

(54) AUTOMOUS VEHICLE BARRICADE

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, Rockport, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 108 days.

(21) Appl. No.: 17/103,591

(22) Filed: Nov. 24, 2020

Related U.S. Application Data

(60) Provisional application No. 62/941,223, filed on Nov. 27, 2019.

(51) Int. Cl.  
*F41H 11/08* (2006.01)  
*G05D 1/02* (2020.01)  
*B60W 60/00* (2020.01)

(52) U.S. Cl.  
CPC ......... *G05D 1/0287* (2013.01); *B60W 60/001* (2020.02); *F41H 11/08* (2013.01); *B60W 2556/45* (2020.02)

(58) Field of Classification Search  
CPC .............. G05D 1/0287; B60W 60/001; B60W 2556/45; F41H 11/08  
See application file for complete search history.

(56) References Cited

U.S. PATENT DOCUMENTS

2012/0173045 A1* 7/2012 Conroy .................. F41H 11/08  
701/1  
2019/0236959 A1* 8/2019 Belapurkar ........ G06Q 20/0855

* cited by examiner

*Primary Examiner* — Vivek D Koppikar  
*Assistant Examiner* — Jeffrey R Chalhoub  
(74) *Attorney, Agent, or Firm* — Plumsea Law Group, LLC

(57) ABSTRACT

Methods and systems for deploying autonomous vehicles to form a barricade in a coordinated response to an imminent threat are described. In one embodiment, a method for deploying autonomous vehicles to form a barricade is described. The method includes determining at least one location for a barricade and determining a plurality of autonomous vehicles that are available to form the barricade. The method also includes sending instructions to the plurality of autonomous vehicles to form the barricade at the at least one location. In response to the instructions, the plurality of autonomous vehicles are configured to move to the at least one location and form the barricade.

20 Claims, 11 Drawing Sheets

AUTOMOUS VEHICLE BARRICADE

This application claims the benefit of U.S. Provisional Patent Application Ser. No. 62/941,223 filed on Nov. 27, 2019 and titled "Autonomous Vehicle Barricade", the disclosure of which is incorporated by reference in its entirety.

BACKGROUND

The present embodiments relate to autonomous vehicles in general, and more particularly, to methods and systems for using autonomous vehicles as a barricade.

Vehicles have increasingly been used for acts of terrorism, including driving trucks or vans with explosives into secured areas or buildings and driving vehicles through crowds of pedestrians. These types of terrorist attacks present numerous problems for controlling vehicular access to secured areas and other places where crowds or large numbers of people may be present. In response to these attacks, many secure areas and buildings have installed a variety of types of barricades or barriers in front of entrances and pedestrian areas. However, these barriers cannot prevent access to every potential target.

Accordingly, there is a need in the art for a system and method that addresses these shortcomings discussed above.

SUMMARY

In one aspect, a method for deploying autonomous vehicles to form a barricade is provided. The method includes determining at least one location for a barricade and determining a plurality of autonomous vehicles that are available to form the barricade. The method also includes sending instructions to the plurality of autonomous vehicles to form the barricade at the at least one location. In response to the instructions, the plurality of autonomous vehicles are configured to move to the at least one location and form the barricade.

In another aspect, a method for detecting an imminent threat and deploying autonomous vehicles to form a barricade is provided. The method includes receiving information associated with an imminent threat and determining a route for the imminent threat that includes at least one road. The method also includes determining, based on the route for the imminent threat, at least one location for a barricade on the at least one road. The method includes determining a plurality of autonomous vehicles that are available to form the barricade and deploying the plurality of autonomous vehicles to form the barricade at the at least one location.

In another aspect, a system for deploying autonomous vehicles to form a barricade is provided. The system includes a plurality of autonomous vehicles and a server including a processor in communication with the plurality of autonomous vehicles via a communication network. The processor of the server is configured to determine at least one location for a barricade and determine the autonomous vehicles of the plurality of autonomous vehicles that are available to form the barricade. The processor of the server is also configured to send instructions to the available autonomous vehicles to form the barricade at the at least one location. In response to the instructions, the available autonomous vehicles are configured to move to the at least one location and form the barricade.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the principles of the example embodiments described herein, a method and system for deploying autonomous vehicles to form a barricade are provided. The techniques of the present embodiments provide a mechanism for using autonomous vehicles to form barricades in a coordinated response to a threat.

Autonomous vehicles of various levels of autonomy and capabilities are becoming an increasingly common part of society. These autonomous vehicles can be found driving on roads in many cities and geographic areas. According to the techniques of the example embodiments, a system and method of using autonomous vehicles to deploy barricades is provided.

Figure 1:
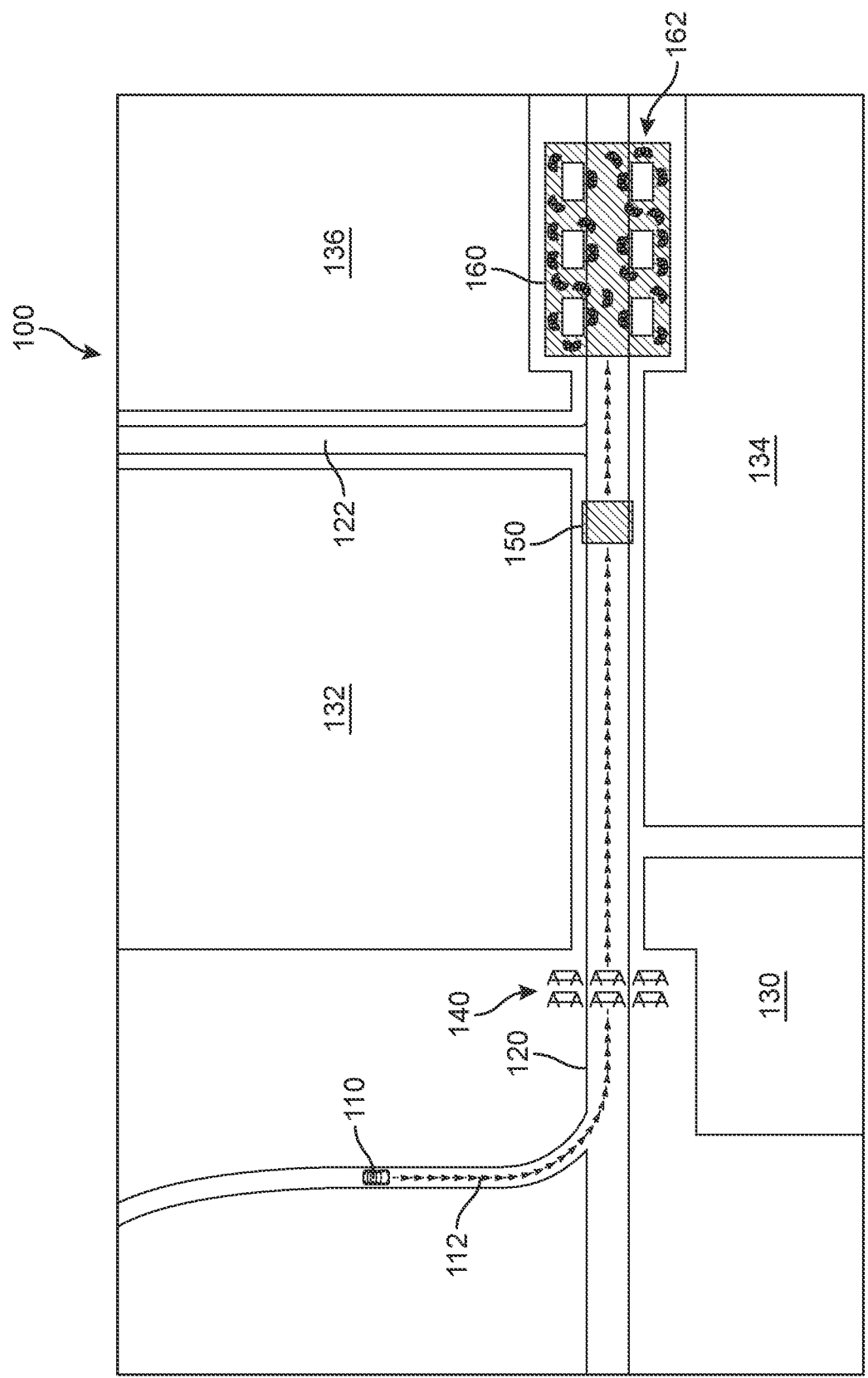
FIG. 1 is a representation view of an example embodiment of a vehicle on a route.

Referring now to FIG. 1, an example embodiment of a scenario in which techniques of the present embodiments may be implemented to provide a barricade using a plurality of autonomous vehicles. In this embodiment, a map 100 is shown of a geographic area where an imminent threat 110 is headed towards an event location 160 where an event 162 including one or more people is occurring.

In an example embodiment, imminent threat 110 is a vehicle traveling on a route 112 towards event location 160. In this embodiment, the geographic area shown on map 100 is a dense urban environment, including at least a road 120 having buildings on either side and an alley 122 located between adjacent buildings. For example, as shown in FIG. 1, at least a first building 130 is located on one side of road 120 and a second building 132 is located on the opposite side of road 120 across from first building 130. Additionally, in this embodiment, at least a third building 134 is located on the same side of road 120 as first building 130 and a fourth building 136 is located on the same side of road 120 as second building 132. Alley 122 is located between second building 132 and fourth building 136 and provides access to road 120.

With this arrangement of buildings (i.e., buildings 130, 132, 134, 136) in the dense urban environment shown on map 100, road 120 represents the primary passageway or ingress for a vehicle approaching event location 160. That is, the presence of buildings on either side of road 120 provides limited options for a vehicle traveling along road 120 to circumvent or avoid barricades on road 120. In one example scenario, when imminent threat 110 is traveling on route 112 towards event location 160, a temporary road block 140 may be deployed on road 120 to attempt to slow or stop the vehicle representing imminent threat 110 from reaching event location 160.

In this example scenario, however, road block 140 may not be sufficiently robust or may not be deployed in time to prevent imminent threat 110 from continuing along route 112 on road 120 towards event location 160. For example, imminent threat 110 may be a heavy or large vehicle that can easily destroy or pass through road block 140. According to the techniques of the present embodiments, a plurality of autonomous vehicles may be deployed to form a barricade at a barricade area 150 on road 120 in front of event location 160 in a coordinated response to imminent threat 110. The barricade at barricade area 150 formed by the plurality of autonomous vehicles may be more robust and capable of withstanding and/or absorbing a greater amount of damage than temporary road block 140.

For example, while temporary road block 140 may use barriers that weigh in the hundreds of pounds, such as sawhorses, barrels, and/or concrete Jersey walls, autonomous vehicles typically weigh many thousands of pounds. Accordingly, a barricade formed by a plurality of autonomous vehicles is capable of withstanding a greater impact from oncoming vehicles. With this arrangement, imminent threat 110 may be stopped or restrained from reaching event location 160 and causing harm to the people participating in event 162 by the autonomous vehicles forming the barricade at barricade area 150.

Figure 2:
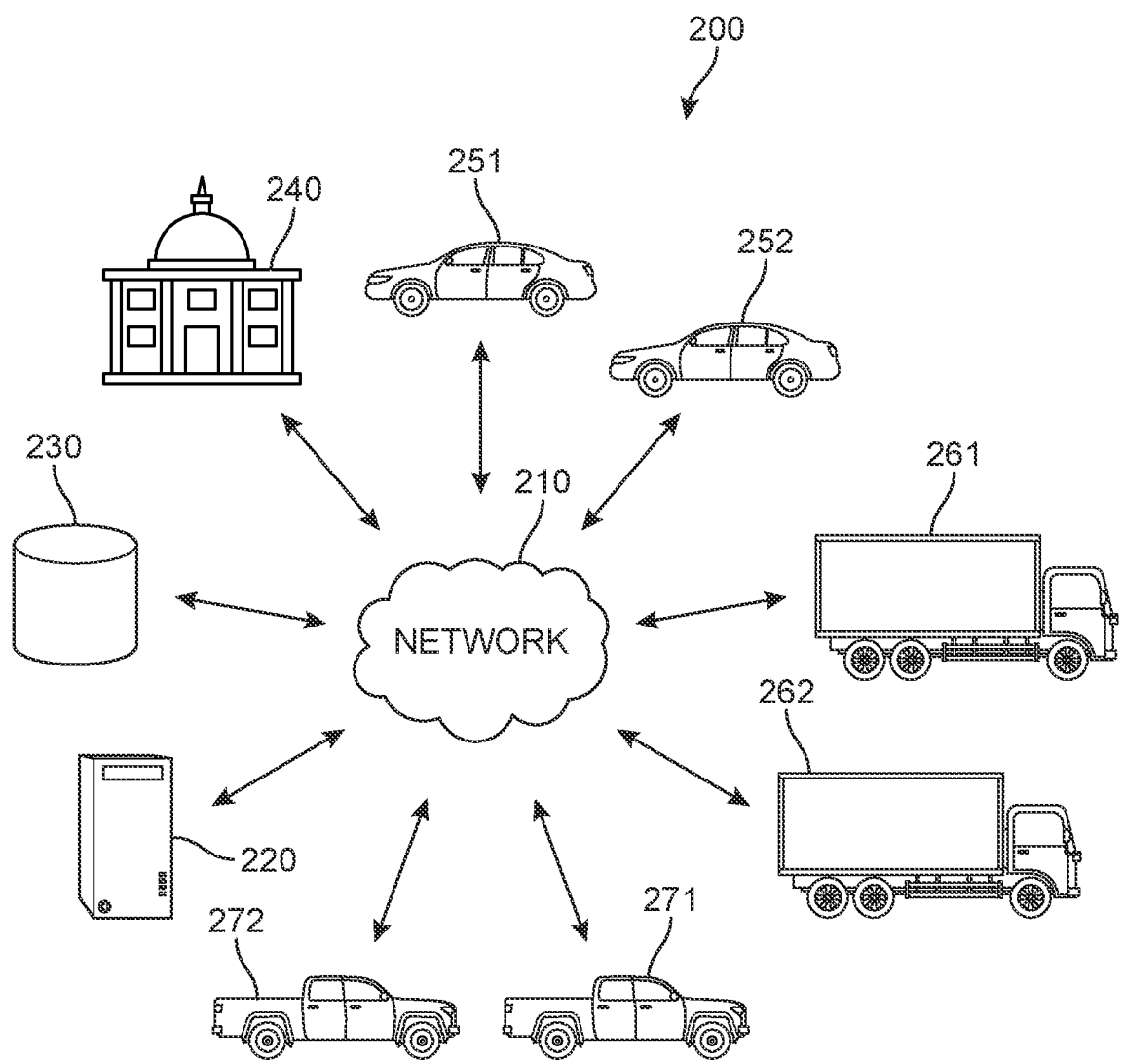
FIG. 2 is a schematic view of an example embodiment of components of an autonomous vehicle barricade system interacting with a network.

Referring now to FIG. 2, components of an autonomous vehicle barricade system 200 for deploying autonomous vehicles to form a barricade is shown interacting with a network 210. In an example embodiment, system 200 includes at least a server 220 in communication with network 210. Network 210 may be a communication network that uses any form of wireless communication technology, including, but not limited to cellular telecommunication networks (e.g., 3G, 4G, 5G, LTE, etc.) or other wireless wide-area networks (WWAN) and/or wireless local-area networks (WLAN).

In an example embodiment, server 220 is a computer including at least one processor that is configured to execute instructions for implementing the techniques according to the example embodiments described herein. For example, server 220 may be configured to analyze information received via network 210 about potential or identified imminent threats, available autonomous vehicles in communication with network 210, roads and routes associated with a geographic area or location, barricade areas, and/or other information that may be used by system 200 for deploying autonomous vehicles to form a barricade.

In some embodiments, system 200 may further include a database 230 in communication with server 220 via network 210. Database 230 may include various information and data used by system 200 for deploying autonomous vehicles to form a barricade, including, but not limited to map data for different geographic areas (e.g., roads, streets, locations, etc.), information associated with a plurality of autonomous vehicles participating or in communication with system 200, criteria or other information used by system 200 for prioritization of autonomous vehicles for deploying a barricade, as well as other information that may be used by system 200 for deploying autonomous vehicles to form a barricade. System 200 and/or server 220 may access database 230 via network 210 for use in implementing the techniques of the example embodiments described herein.

In some embodiments, system 200 may further include a municipal agent 240, such as a governmental agency or office. Municipal agent 240 may contribute information or data about available autonomous vehicles to system 300, for example, autonomous governmental vehicles, such as mail delivery vehicles, law enforcement vehicles, fire and rescue vehicles, or other autonomous municipal vehicles that may be made available to system 200 for deployment to form a barricade.

Municipal agent 240 may also contribute information or data about detection and/or determination of an imminent threat (e.g., imminent threat 110, shown in FIG. 1). For example, municipal agent 240 may receive notifications or bulletins from law enforcement officials regarding imminent threats or potential imminent threats. In other embodiments, municipal agent 240 may use data or information from cameras, drones, satellites, observers, etc. to detect unusual or potentially dangerous behavior by a vehicle to determine that a likely or possible imminent threat exists. This information may be provided to system 200 and/or server 220 via network 210 for use in deploying autonomous vehicles to form a barricade, as described in the example embodiments.

In some embodiments, municipal agent 240 may establish or provide a policy or ranking to server 220 for determining the priority for deploying one or more types or categories of autonomous vehicles to form a barricade. For example, municipal agent may prioritize use of government-owned autonomous vehicles over privately-owned autonomous vehicles to minimize the damage inflicted upon vehicles owned by citizens when protecting the public from an imminent threat. In addition, other prioritizations and/or rankings may be provided by municipal agent 240 in accordance with government or municipal procedures. In other embodiments, system 200 and/or 220 may also determine prioritizations and/or rankings based on other or additional criteria, as will be described in more detail below with reference to FIGS. 5-6.

In an example embodiment, autonomous vehicle barricade system 200 may include a plurality of autonomous vehicles, including vehicles of different types, categories, weights, etc. For example, as shown in FIG. 2, system 200 may include one or more autonomous vehicles of a first type, such as passenger vehicles (e.g., sedans, coupes, wagons, etc.), including a first autonomous vehicle 251 and a second autonomous vehicle 252. System 200 may also include one or more autonomous vehicles of a second type, such as heavy trucks or machines (e.g., tractor-trailers, box trucks, other large and/or heavy-duty vehicles), including a third autonomous vehicle 261 and a fourth autonomous vehicle 262. System 200 may further include one or more autonomous vehicles of a third type, such as small or light trucks or utility vehicles (e.g., pick-ups, SUVs, CUVs, vans, campers, etc.), including a fifth autonomous vehicle 271 and a sixth autonomous vehicle 272. It should also be understood that system 200 may include additional other types or categories of autonomous vehicles other than the examples shown in reference to FIG. 2.

In this embodiment, autonomous vehicles of different types (e.g., first type, second type, third type) are grouped according to vehicle classification. It should be understood that other factors or parameters may be used to group autonomous vehicles according to different types. For example, in other embodiments, autonomous vehicle types may be grouped based on vehicle weights (e.g., curb weights or gross axle weights), vehicle dimensions (e.g., length, width, height, etc.), crash-worthiness ratings, material composition (e.g., steel, aluminum, etc.), value or repair costs, or other criteria.

While six representative autonomous vehicles (e.g., autonomous vehicles 251, 252, 261, 262, 271, 272) are shown in the example depicted in FIG. 2, it should be understood that in various embodiments, system 200 may include a large number of autonomous vehicles. For example, in a given geographic area, system 200 may include hundreds, thousands, or more individual autonomous vehicles that are available for use by system 200 to deploy to form a barricade.

Figure 3:
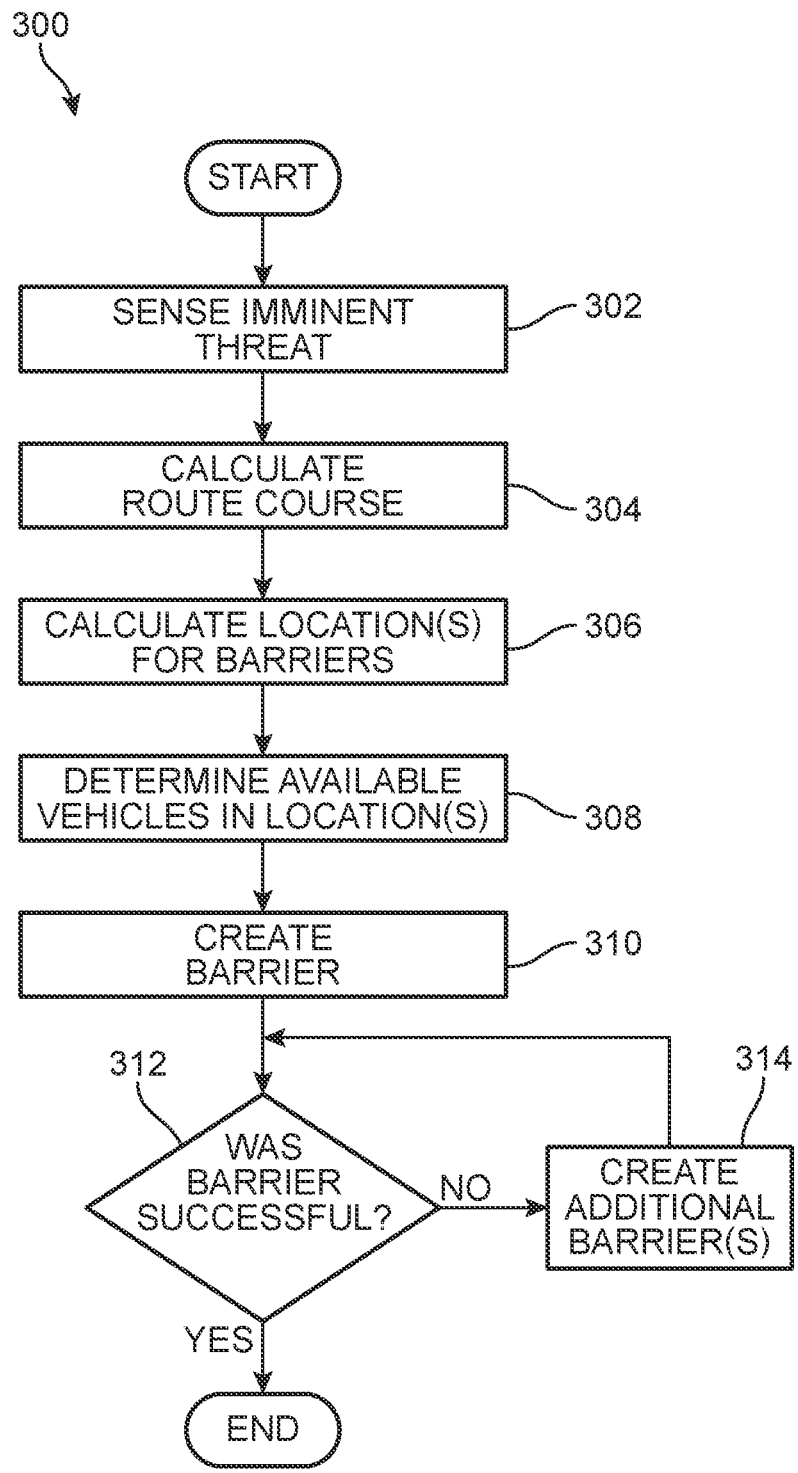
FIG. 3 is a flowchart of an example embodiment of a method for deploying autonomous vehicle barriers.

Referring now to FIG. 3, a flowchart of an example embodiment of a method 300 for deploying autonomous vehicle barriers is shown. In an example embodiment, method 300 may be implemented by autonomous vehicle barricade system 200, for example, by server 220, described above. In this embodiment, method 300 begins with an operation 302 where an imminent threat is sensed or detected. For example, as described in the scenario shown in FIG. 1 above, imminent threat 110 is a vehicle that is heading on route 112 towards event location 160. In some cases, data or information used to sense or determine that an imminent threat exists at operation 302 may be provided from a variety of sources. For example, sources may include one or more of observations by autonomous vehicles (e.g., using on-board cameras and sensors), reports from observers or concerned people (e.g., via calls to emergency hotlines or law enforcement), data or information from cameras, drones, or satellites (e.g., red-light cameras, speed cameras, other security cameras or sensors), tracked or monitored suspect vehicles (e.g., in coordination with law enforcement or government agencies), or other sources that can detect or sense potential imminent threats from vehicles.

Next, method 300 includes an operation 304. At operation 304, a route or course of the imminent threat sensed or detected at operation 302 is determined. In some embodiments, the data or information used as part of the determination of the imminent threat at operation 302 may also be used to determine the route or course of the imminent threat. For example, as shown in FIG. 1 above, imminent threat 110 is associated with route 112 along road 120. At operation 304, at least one or more of a heading, speed, direction, and/or travel roads or paths to a destination may be used to determine the likely route or course for the imminent threat.

Method 300 further includes an operation 306 where one or more locations are calculated or determined for deploying barriers formed by a plurality of autonomous vehicles. In some embodiments, operation 306 may include analyzing a map of the geographic area of interest (e.g., map 100, shown in FIG. 1) and using the information about the route or course of the imminent threat from operation 304 to determine where one or more barricades should be deployed to stop or restrict the imminent threat from reaching a destination. For example, as shown in FIG. 1, a plurality of autonomous vehicles may be deployed to form a barricade at barricade area 150 on road 120 in front of event location 160 in a coordinated response to imminent threat 110. Additionally, in some embodiments, operation 306 may further include determining alternate or additional barricade areas in response to the imminent threat.

Next, method 300 includes an operation 308. At operation 308, the available autonomous vehicles within proximity to the selected barricade location(s) from operation 306 are determined. In some embodiments, the autonomous vehicles located within a predetermined radius or distance from each barricade location may be determined at operation 308. In other embodiments, the proximity may be based on shortest or fastest available routes from an autonomous vehicle's current location to the selected barricade location. In different embodiments, various factors may be used in determining the available autonomous vehicles for a given barricade location, including, but not limited to: vehicle speed, vehicle status (e.g., parked or in transit), distance to the location, traffic status on routes to the location, charge levels or capacity of the vehicle, etc.

Upon determining the available autonomous vehicles at operation 308, method 300 proceeds to an operation 310 where the selected autonomous vehicles are deployed to the selected location or locations to create the barricade. In some embodiments, operation 310 may further include instructions provided to each autonomous vehicle that will be part of the barricade to travel to the selected barricade location. Additionally, in some embodiments, the instructions may also include information regarding coordination between the plurality of autonomous vehicles to arrange themselves in a particular order or configuration at the location of the barricade. For example, operation 310 may include instructions to larger and/or heavier autonomous vehicles to assume a position at the center of the barricade so as to absorb more of a potential impact from the imminent threat than smaller autonomous vehicles. Similarly, smaller and/or lighter autonomous vehicles may be instructed to assume positions along the edges or periphery of the barricade.

In some embodiments, method 300 may end upon creation of the barricade formed by the autonomous vehicles at operation 310. In other embodiments, method 300 may further include additional operations configured to determine whether or not a barricade was successful in stopping or restraining the imminent threat. For example, as shown in FIG. 3, method 300 may further include an operation 312 where whether or not the barricade was successful is determined.

Upon determining at operation 312 that the barricade was not successful (i.e., the imminent threat was not stopped or restrained), then method 300 may proceed to an operation 314. At operation 314, one or more additional barricades or barriers may be deployed at other locations to attempt to stop or restrain the imminent threat. In some embodiments, operation 314 may include reiterations of previous operations of method 300, such as one or more of operations 302, 304, 306, 308, and 310 described above. Upon determining at operation 312 that the barricade was successful (i.e., the imminent threat was stopped or restrained), then method 300 may end. It should be understood that method 300 may be repeatedly and/or concurrently implemented throughout different areas of a given geographic area to deploy barricades for multiple imminent threats.

Figure 4:
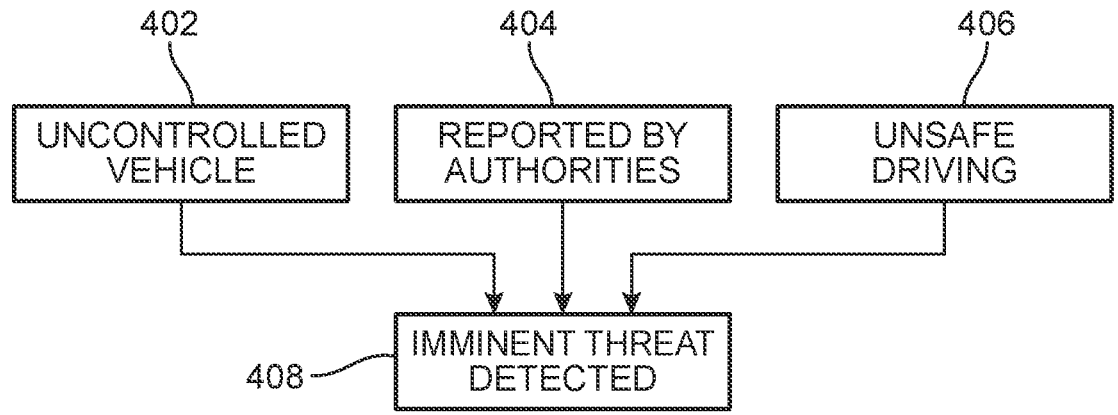
FIG. 4 is a schematic diagram of an example embodiment of factors or criteria associated with detecting an imminent threat.

Referring now to FIG. 4, examples of representative factors or criteria associated with detecting or determining an imminent threat are shown. In some embodiments, different factors and criteria or various combinations of factors and criteria may be used to detect or determine that a vehicle represents an imminent threat. For example, as shown in FIG. 4, a first factor 402 may be an uncontrolled vehicle. Uncontrolled vehicles may include runaway vehicles or vehicles with a mechanical, electrical, or computer malfunction that prevents the vehicle from being controlled normally or safely. For example, an uncontrolled vehicle may not be able to control acceleration, braking, steering, etc.

A second factor 404 may be a vehicle reported by authorities as being dangerous or an imminent threat. For example, police or other law enforcement agencies may issue an alert or warning about a dangerous driver, a suspected bad actor, or other health or safety problem, such as an AMBER alert (i.e., issued for child abductions) or Silver alerts (i.e., issued for senior citizens with diminished health or mental capacities).

A third factor 406 may be a vehicle detected or observed driving in an unsafe manner so as to be a potential imminent threat. Many geographic areas include sensors or cameras that are capable of detecting and/or monitoring vehicle speed and capturing vehicles that fail to stop at red lights. Information from these sources, as well as other sources, such as observers or data from other vehicles (e.g., using on-board sensors), may be included in third factor 406.

As described above, any one factor or combination of factors (e.g., first factor 402, second factor 404, and/or third factor 406) may be used to determine an imminent threat 408. For example, each factor may have a threshold level above which a vehicle is determined to be an imminent threat. In other cases, a combination of factors that may not be sufficient alone may be used to determine that a vehicle is an imminent threat. It should be understood that the factors or criteria shown in FIG. 4 (i.e., first factor 402, second factor 404, and/or third factor 406) used to detect or determine imminent threat 408 are exemplary. In other embodiments, additional or alternative factors or criteria may be used to detect or determine imminent threat 408.

Additionally, in some embodiments, the factors or criteria may be selected based on particular characteristics or properties of a given geographic area to detect or determine imminent threat 408. For example, in a high-security geographic area (e.g., near governmental offices or buildings) thresholds for factors or criteria used to determine an imminent threat may be lower or more sensitive, given the nature of the geographic area. Similarly, in other areas where the potential for an imminent threat to the public is lower, thresholds for factors or criteria used to determine an imminent threat may be higher or less sensitive.

Figure 5:
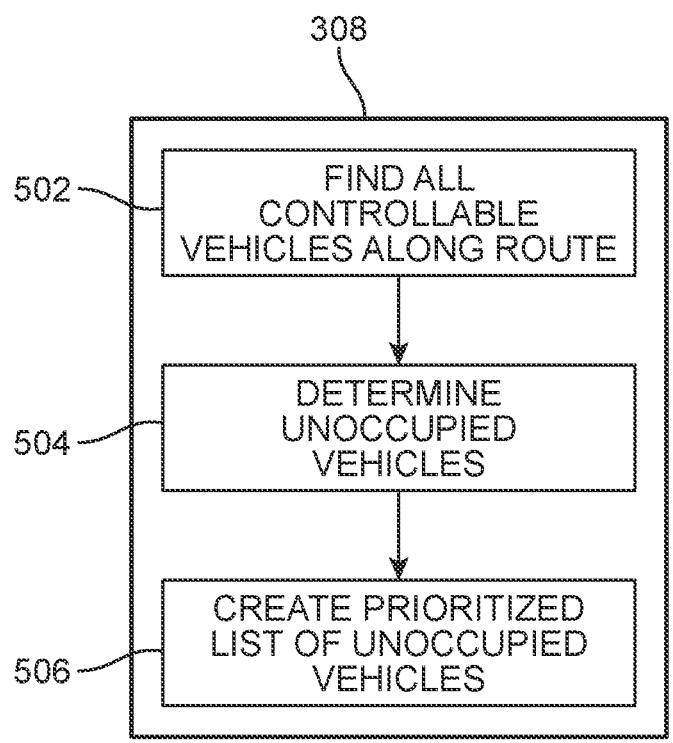
FIG. 5 is a flowchart of an example embodiment of a method for determining available autonomous vehicles to create a barrier.

Referring now to FIG. 5, a flowchart of an example embodiment of a method for determining available autonomous vehicles to create a barrier is shown. In some embodiments, the method shown in FIG. 5 may be implemented as part of operation 308 of method 300, described above. In other embodiments, the method shown in FIG. 5 may be implemented on a regular or periodic basis so that a list or database of available autonomous vehicles is maintained to save time once an imminent threat is detected. For example, locations of participating autonomous vehicles may be tracked or followed by system 200 and/or server 220 using global positioning system (GPS) data received from the vehicles.

In this embodiment, operation 308 of method 300 for determining available autonomous vehicles to create a barrier includes an operation 502. At operation 502, all controllable autonomous vehicles along a route of the imminent threat are found. For example, as shown in FIG. 1, imminent threat 110 is traveling along route 112, therefore, according to operation 502, all controllable or participating autonomous vehicles along or near route 112 are found.

Next, the method of operation 308 may further include an operation 504 where the found autonomous vehicles from operation 502 that are unoccupied are determined. In some embodiments, operation 504 may include receiving or analyzing data or information from the autonomous vehicles that indicate whether or not the vehicle is unoccupied or occupied. For example, data from occupancy sensors, weight sensors, airbag sensors, etc. may indicate the presence or absence of occupants in a vehicle. In other cases, occupancy of the vehicle may be inferred from other data, such as whether or not the autonomous vehicle is parked or in motion, or whether a cell phone is present within the vehicle (i.e., indicating the vehicle is likely occupied). It should be understood that other data or information may be used as part of operation 504 to determine the occupancy status of the autonomous vehicle. With this arrangement, any autonomous vehicle that is currently occupied is not considered for use in deploying a barricade.

The method of operation 308 may also include an operation 506 where a prioritized list of unoccupied autonomous vehicles is created. The factors used for prioritizing the list of unoccupied autonomous vehicles may vary. For example, in some embodiments, prioritization may be based on the vehicle classification or type, described above, including but not limited to vehicle weights (e.g., curb weights or gross axle weights), vehicle dimensions (e.g., length, width, height, etc.), crash-worthiness ratings, material composition (e.g., steel, aluminum, etc.), value or repair costs, or other criteria. In other embodiments, prioritization may be based on vehicle ownership status, for example, with government or municipal-owned vehicles being given first priority for use in deploying a barricade, followed by privately-owned vehicles. It should be understood that the priority may vary based on the nature of the imminent threat, the geographic area, and/or policies determined by the municipal agent.

Additionally, in some embodiments, cargo type may be used as a selection factor for non-passenger vehicles, such as trucks. For example, autonomous vehicles that are carrying hazardous, combustible, and/or explosive materials, or sensitive cargo, such as live animals, medical supplies, etc., will be excluded from being selected to participate in forming a barrier. In some embodiments, such vehicles may be prioritized as a last resort option, for example, in the most exigent circumstances. In addition, autonomous trucks opting to participate in system 200 may be required to affirmatively indicate that the current cargo is not a restricted cargo type, listed above. Such affirmation may be required upon each change in cargo or trailers to ensure that the autonomous truck is not hauling dangerous or sensitive cargo.

Figure 6:
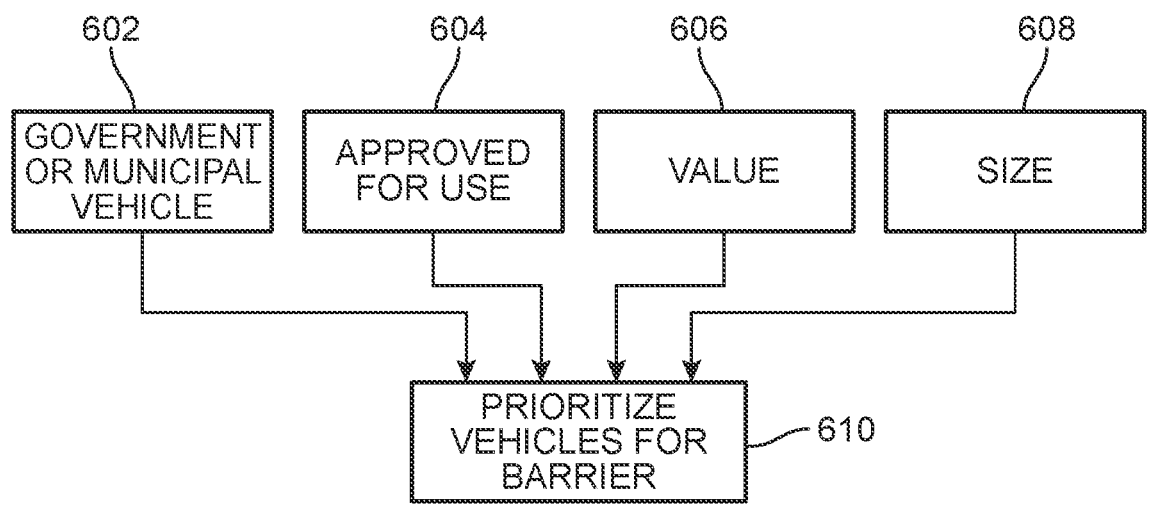
FIG. 6 is a schematic diagram of an example embodiment of factors or criteria associated with vehicle prioritization.

FIG. 6 is a schematic diagram of examples of representative factors or criteria associated with vehicle prioritization is shown. In some embodiments, different factors and criteria or various combinations of factors and criteria may be used to prioritize the autonomous vehicles that are deployed for a barricade. For example, as shown in FIG. 6, a first factor 602 may be whether the autonomous vehicle is a governmental or municipal vehicle. In an example embodiment, autonomous vehicles owned or operated by the government or other municipal agencies (e.g., associated with municipal agent 240 above) may automatically be included as part of system 200.

Next, a second factor 604 may be whether the autonomous vehicle is approved for use. In some embodiments, participation and/or inclusion of other autonomous vehicles as part of autonomous vehicle barricade system 200, such as privately-owned vehicles or fleet vehicles, may be based on an affirmative opt-in basis by the vehicle owner or operator. For example, an owner of an autonomous vehicle may choose to allow their autonomous vehicle to be used for deploying a barricade by system 200.

In some embodiments, system 200 may be configured to reject a configurable list of vehicle types to prevent them from being able to be used as a barricade vehicle, such as fuel haulers, school buses or child care haulers, medical waste haulers, mobile welders, or other types of vehicles where the use of the vehicle provides more risk than is acceptable.

In other embodiments, participation and/or inclusion in system 200 may be conditioned or based on receiving benefits or other compensation for allowing the autonomous vehicle to be used for deploying a barricade by system 200. For example, an owner or operator of an autonomous vehicle may receive an incentive of some type for participation in system 200, such as charging privileges, reduced insurance rates, full replacement of vehicle, discounted registration fees, etc. In still other embodiments, autonomous vehicles may be conscripted for participation in system 200 based on exigent circumstances to protect the public from an imminent threat.

A third factor 606 may be a value or replacement cost of the autonomous vehicle. For example, the system may choose to prioritize less expensive or less costly vehicles to repair over more expensive or more costly to repair vehicles to minimize or reduce the potential monetary damage inflicted upon the autonomous vehicles that form the barricade. A fourth factor 608 may be a size of the autonomous vehicle, such as based on vehicle dimensions or weight. For example, the system may choose to prioritize larger or heavier vehicles for deploying a barricade over smaller or lighter vehicles, as larger or heavier vehicles would be more effective in stopping or restraining the imminent threat.

Any one factor or combination of factors (e.g., first factor 602, second factor 604, third factor 406, and/or fourth factor 608) may be used to determine the prioritized list 610 of autonomous vehicles for the barrier. In other embodiments, additional or alternative factors or criteria may be used to create the prioritized list 610.

Figure 7:
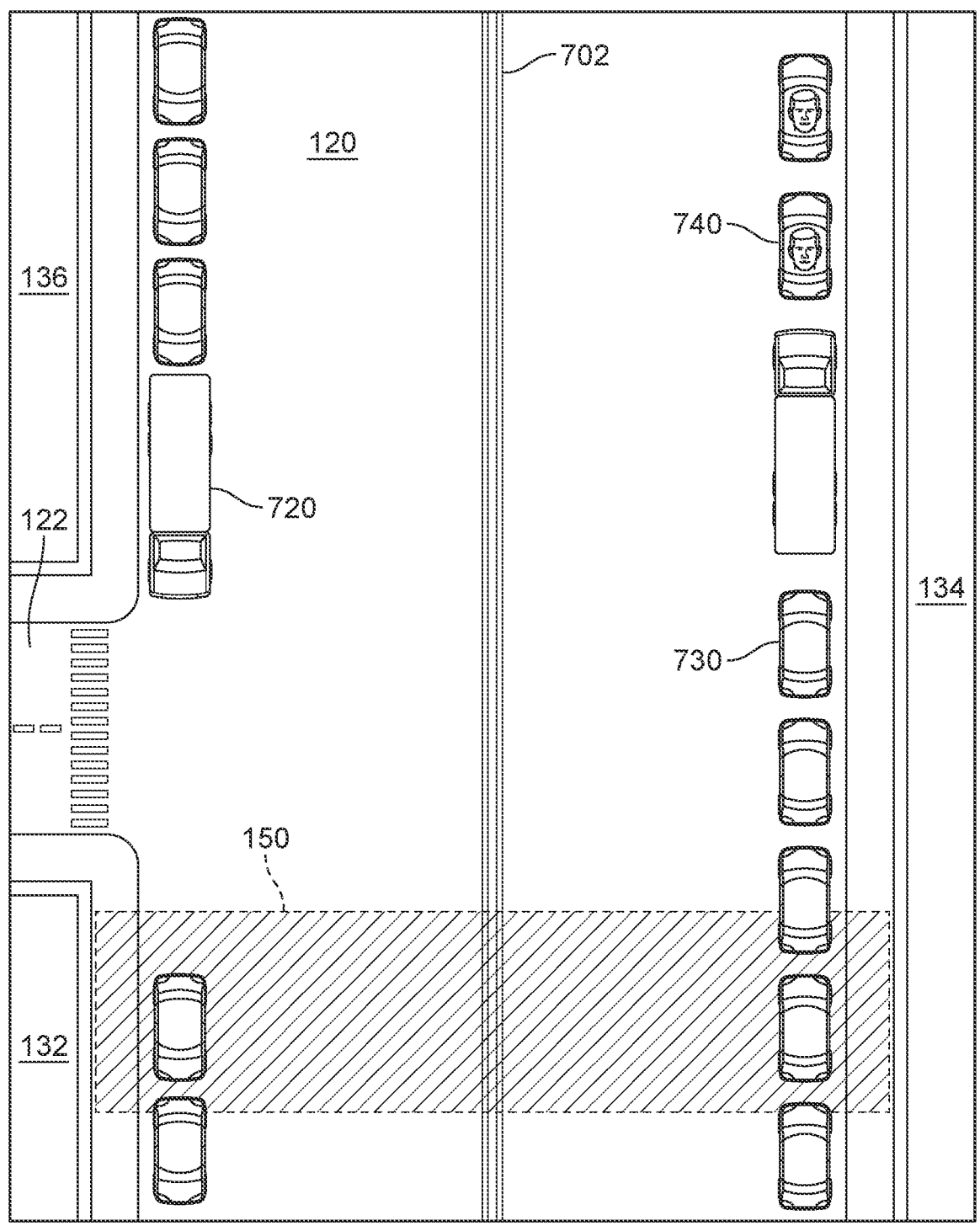
FIG. 7 is a representational view of an example embodiment of a road with parked vehicles.

The techniques of the present embodiments for deploying autonomous vehicles to form a barricade in a coordinated response to an imminent threat may be described in reference to example scenarios shown in FIGS. 7-9 and FIGS. 10-12 below. Referring now to FIG. 7, a representational view of an example embodiment of a road with parked vehicles is shown according to an example scenario. In this embodiment, a detailed portion of road 120 from FIG. 1 is shown. In this scenario, imminent threat 110 is heading towards event location 160 and the plurality of autonomous vehicles are deployed to form a barricade at barricade area 150.

As shown in FIG. 7, a plurality of autonomous vehicles are parked at locations along both sides of road 120 near barricade area 150, including on either side of a lane divider 702. For example, an autonomous truck 720 is located on the side of road 120 parked near fourth building 136, an autonomous passenger vehicle 730 is located on the opposite side of road 120 parked near third building 134, and an occupied autonomous vehicle 740 is also parked near third building 134. Additionally, other autonomous vehicles are also parked along either side of road 120 near barricade area 150.

Figure 8:
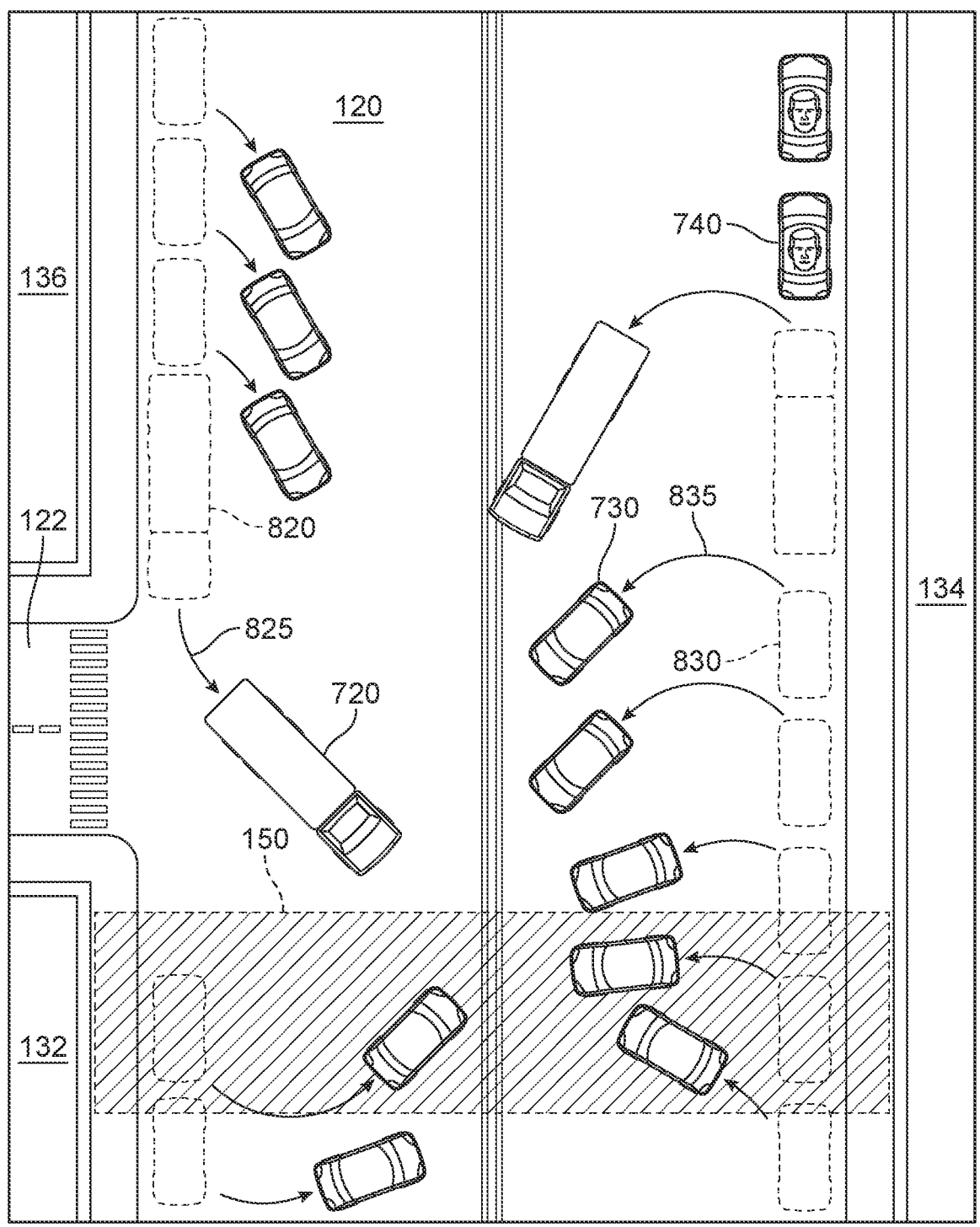
FIG. 8 is a representational view of an example embodiment of a road with vehicles in motion.

Referring now to FIG. 8, according to the example scenario, autonomous vehicle barricade system 200 has implemented method 300 to deploy a barricade formed by the plurality of autonomous at barricade area 150. Accordingly, the plurality of autonomous vehicles near barricade area 150 coordinate to form a barricade at barricade area 150 in response to imminent threat 110 headed on route 112 along road 120 (shown in FIG. 1 above).

In this embodiment, each of the autonomous vehicles that will be part of the barricade at barricade area 150 begins to move in coordination with the other autonomous vehicles towards barricade area 150. For example, autonomous truck 720 moves from an initial position 820 along the side of road 120 near fourth building 136 in a direction 825 towards barricade area 150. Similarly, autonomous passenger vehicle 730 moves from an initial position 830 near third building 134 in a direction 835 towards barricade area 150. Additionally, the remaining plurality of autonomous vehicles that will form the barricade at barricade area 150 similarly move from their parked initial locations in directions towards barricade area.

Figure 9:
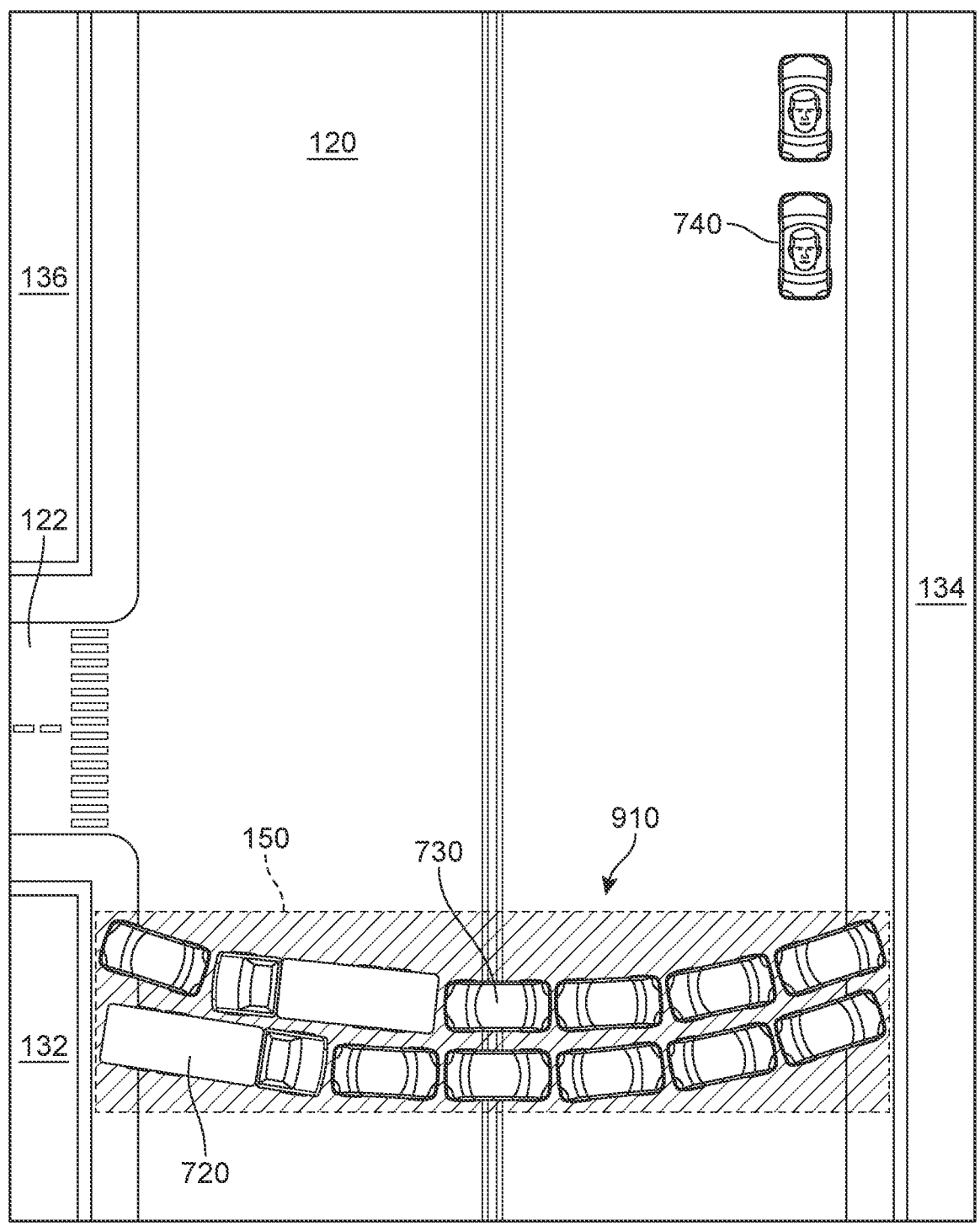
FIG. 9 is a representational view of an example embodiment of a road with a vehicle barrier.

Referring now to FIG. 9, the described scenario is shown with an example embodiment of a barricade 910 or barrier formed by the plurality of autonomous vehicles at barricade area 150. In this embodiment, the plurality of autonomous vehicles have moved as shown in FIG. 8 to form barricade 910 across road 120 at barricade area 150. Barricade 910 extends across both lanes of road 120 on either side of lane divider 702 in road 120. Additionally, barricade 910 extends past road 120 and near the adjacent buildings (e.g., second building 132 and third building 134) so that the imminent threat driving down road 120 cannot avoid barricade 910 by driving around it on the sidewalks.

For example, as shown in FIG. 9, the plurality of autonomous vehicles deployed to form barricade 910 are arranged in two rows having an arc shape with the convex portion facing towards the incoming direction of the imminent threat on road 120. It should be understood that the arrangement of barricade 910 shown in FIG. 9 is exemplary and other configurations or arrangements of the autonomous vehicles forming barricade 910 may be provided. With this arrangement, barricade 910 is configured to absorb the impact from the imminent threat to stop and/or restrain the imminent threat from proceeding past barricade area 150 on road 120.

In this embodiment, barricade 910 is formed by a combination of large vehicles, including trucks (e.g., autonomous truck 720), and smaller vehicles, including passenger vehicles (e.g., autonomous passenger vehicle 730). In other embodiments, the arrangement and/or composition of the barricade may depend on the available autonomous vehicles that are in positions to be deployed to form a barricade. In addition, in the example scenario described in reference to FIGS. 7-9 above, the autonomous vehicles used to form barricade 910 have been deployed without consideration of any prioritization, as described above.

Additionally, as shown in FIG. 9, the autonomous vehicles which are determined to be occupied (as indicated by a face icon) according to any of the techniques described above are not used to form the barricade at barricade area 150. For example, in contrast with the other autonomous vehicles shown in FIG. 9, occupied autonomous vehicle 740 remains parked near third building 134 and does not move towards barricade area 150. Other occupied autonomous vehicles similarly remain in their initial positions and are not used to form barricade 910.

In some embodiments, occupied autonomous vehicles that are close to or near a barricade area (e.g., barricade area 150) may be sent a warning or alert to inform the occupants of the vehicle that an imminent threat is headed towards the area. With this arrangement, occupants of vehicles near the barricade formed by the autonomous vehicles may be given warnings or notice so that they may take safety precautions in response to the incoming imminent threat.

In some embodiments, additional coordinated responses to the imminent threat may be implemented by one or more of the autonomous vehicles forming the barricade. For example, in one embodiment, the high-beam headlights of the autonomous vehicles may be used to coordinate blinding or dazzling an oncoming attacker in a vehicle that is an imminent threat. In these embodiments, the autonomous vehicles forming the first row of the barricade may face towards the direction of the oncoming imminent threat so that the vehicle's high-beam headlights are directed towards the imminent threat. In another embodiment, hazard lights and/or other vehicle lights or lamps of the autonomous vehicles may be actuated to provide a warning or alert to other vehicles or people in the immediate area of a barricade.

Figure 10:
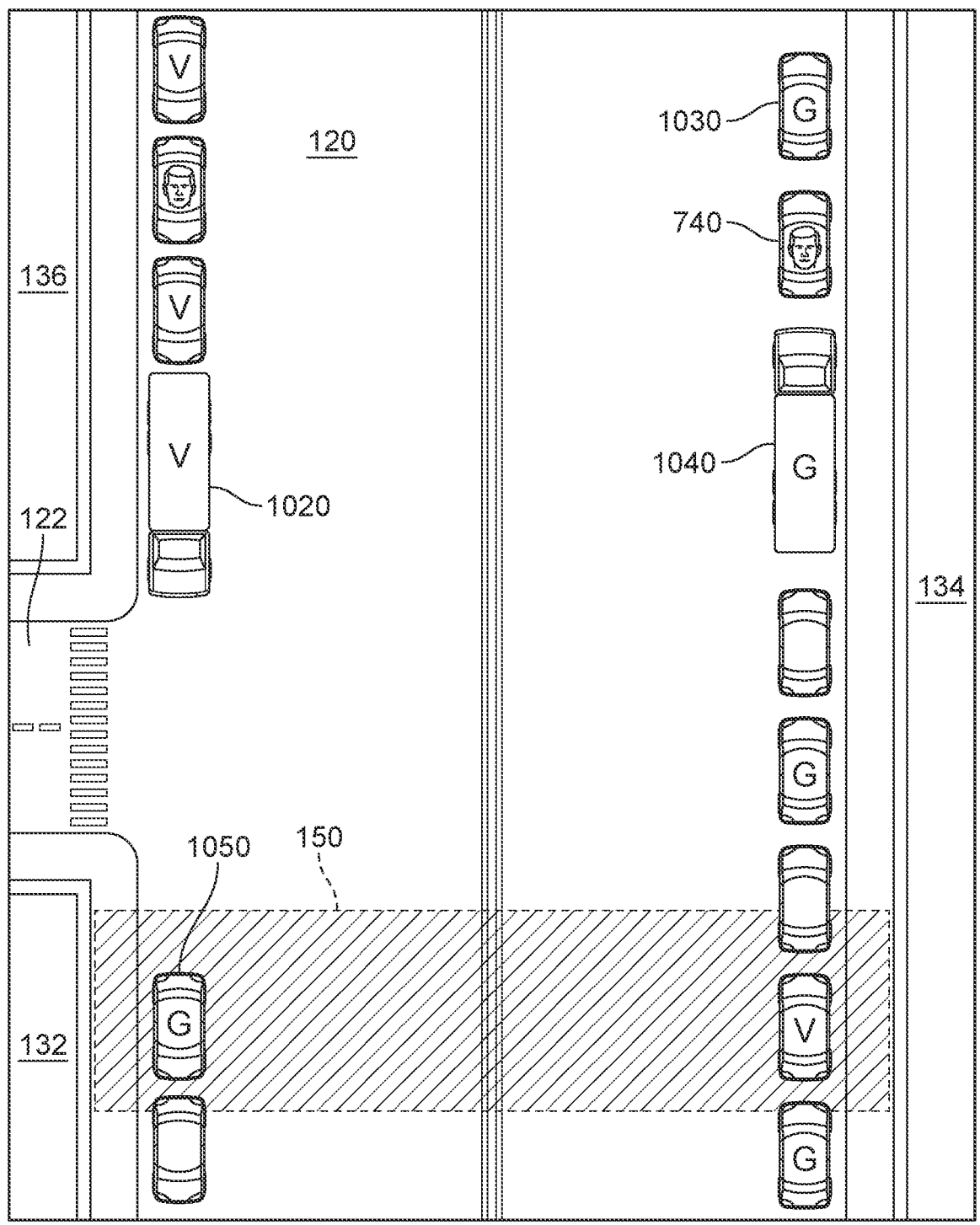
FIG. 10 is a representational view of an alternative embodiment of a road with parked vehicles.
Figure 11:
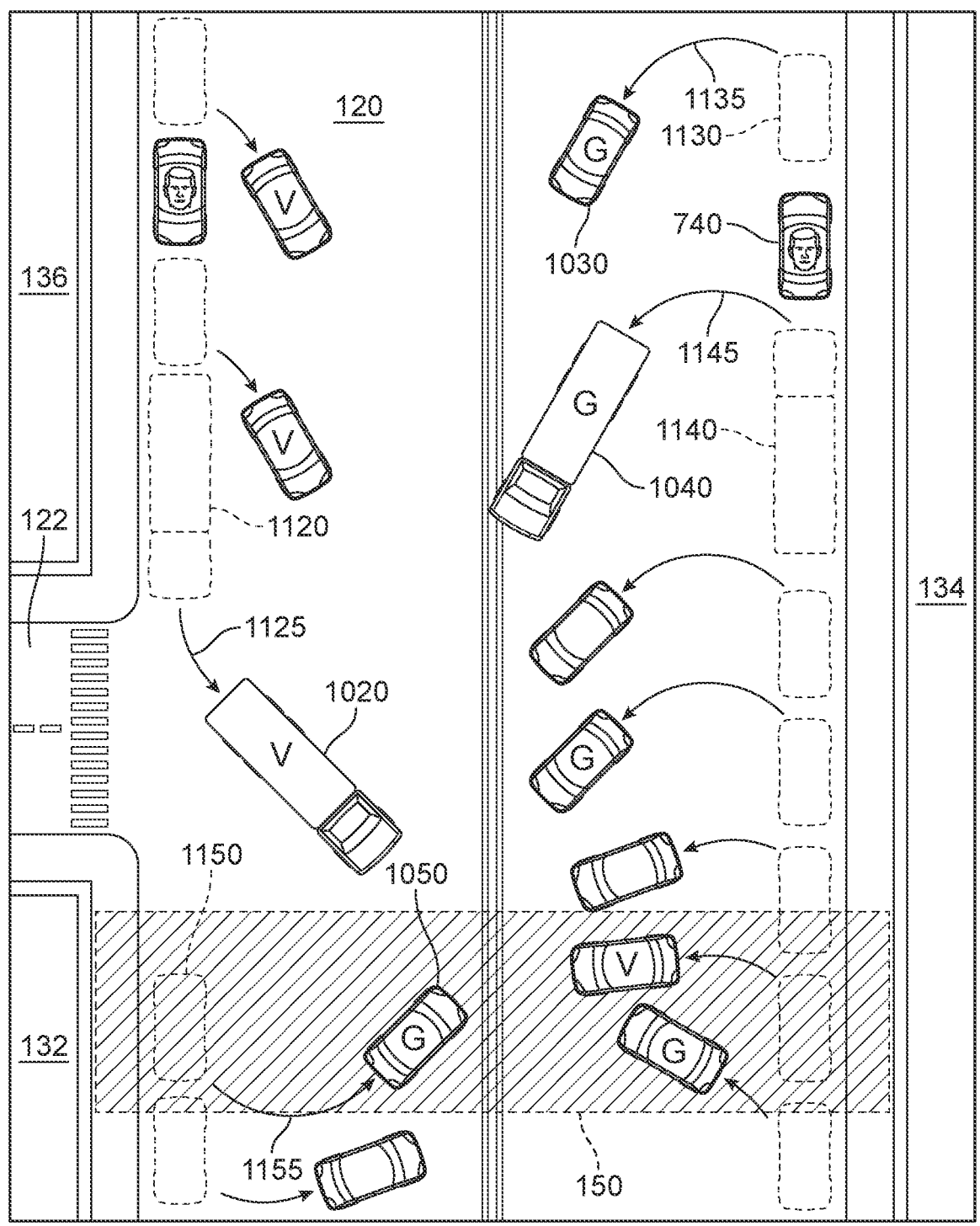
FIG. 11 is a representational view of an alternative embodiment of a road with vehicles in motion.
Figure 12:
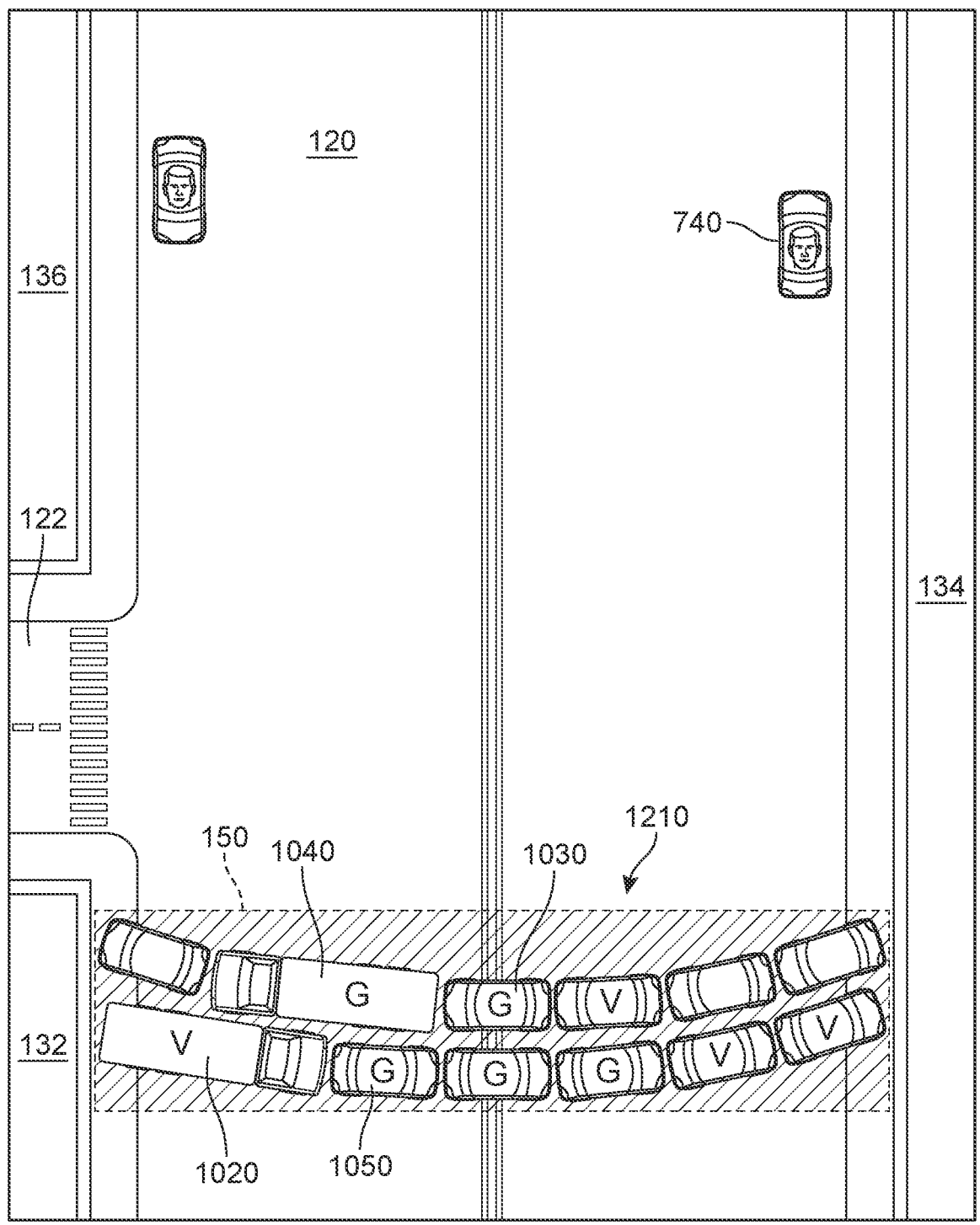
FIG. 12 is a representational view of an alternative embodiment of a road with a vehicle barrier.

Referring now to FIGS. 10-12, an alternate example scenario of deploying autonomous vehicles to form a barricade in a coordinated response to an imminent threat is shown. In this scenario, as compared to the previous scenario shown in FIGS. 7-9 above, the autonomous vehicles used to form the barricade are selected based on one or more prioritization factors. FIG. 10 is a representational view of an embodiment of a road with parked vehicles according to an alternate example scenario. In this embodiment, a detailed portion of road 120 from FIG. 1 is shown. In this scenario, imminent threat 110 is heading towards event location 160 and the plurality of autonomous vehicles are deployed to form a barricade at barricade area 150.

As shown in FIG. 10, a plurality of autonomous vehicles are parked at locations along both sides of road 120 near barricade area 150. In this scenario, available autonomous vehicles are prioritized based on at least one criteria or factor, as described above in reference to FIG. 6. For example, in this embodiment, the plurality of autonomous vehicles are prioritized based on a combination of first factor 602 (i.e., whether the autonomous vehicle is a governmental or municipal vehicle) and second factor 604 (i.e., whether the autonomous vehicle is approved for use). Accordingly, as shown in FIG. 10, some of the autonomous vehicles are identified with a "G" to indicate that the autonomous vehicle is a governmental or municipal vehicle and some of the autonomous vehicles are identified with a "V" to indicate that the autonomous vehicle is a volunteer vehicle that has been approved to be used to form a barricade.

In this embodiment, an autonomous volunteer truck 1020 is located on the side of road 120 parked near fourth building 136, an autonomous government passenger vehicle 1030 is located on the opposite side of road 120 parked near third building 134, an autonomous government truck 1040 is also parked near third building 134, and another autonomous government passenger vehicle 1050 is parked near second building 132 in barricade area 150. An occupied autonomous vehicle 740 is also parked near third building 134. Additionally, other autonomous vehicles, including governmental vehicles (i.e., identified with a "G"), volunteer vehicles (i.e., identified with a "V"), and occupied vehicles (i.e., identified with a face icon) are also parked along either side of road 120 near barricade area 150.

Referring now to FIG. 11, according to the alternate example scenario, autonomous vehicle barricade system 200 has implemented method 300 to deploy a barricade formed by the plurality of autonomous at barricade area 150 using a prioritized list of autonomous vehicles. Accordingly, the plurality of autonomous vehicles near barricade area 150 coordinate to form a barricade at barricade area 150 in response to imminent threat 110 headed on route 112 along road 120 (shown in FIG. 1 above) according to the identified prioritization. In this scenario, the prioritization of the prioritized list is based on first factor 602 and second factor 604, described above. It should be understood that in other scenarios or embodiments, other factors or criteria, including those described above, may be used by system 200 to generate the prioritized list of autonomous vehicles to be used to form the barricade at barricade area 150.

In this embodiment, each of the autonomous vehicles that will be part of the barricade at barricade area 150 begins to move in coordination with the other autonomous vehicles towards barricade area 150. For example, autonomous volunteer truck 1020 moves from an initial position 1120 along the side of road 120 near fourth building 136 in a direction 1125 towards barricade area 150. Similarly, autonomous government passenger vehicle 1030 moves from an initial position 1130 near third building 134 in a direction 1135 towards barricade area 150. Autonomous government truck 1040 also moves from an initial position 1140 near third building 134 in a direction 1145 towards barricade area 150 and autonomous government passenger vehicle 1050 also moves from its initial position 1150 in a direction 1155 towards barricade area 150. Additionally, the remaining plurality of autonomous vehicles that will form the barricade at barricade area 150 (i.e., according to the selected prioritization) similarly move from their parked initial locations in directions towards barricade area.

Referring now to FIG. 12, the described scenario is shown with an example embodiment of a barricade 1210 or barrier formed by the plurality of autonomous vehicles at barricade area 150. In this embodiment, the plurality of autonomous vehicles have moved as shown in FIG. 11 to form barricade 1210 across road 120 at barricade area 150. Barricade 1210 extends across both lanes of road 120 and past road 120 near the adjacent buildings (e.g., second building 132 and third building 134) so that the imminent threat driving down road 120 cannot avoid barricade 1210 by driving around it on the sidewalks.

For example, as shown in FIG. 12, the plurality of autonomous vehicles deployed to form barricade 1210 are arranged in two rows having an arc shape with the convex portion facing towards the incoming direction of the imminent threat on road 120. Additionally, in this scenario, the arrangement of the autonomous vehicles within barricade 1210 is based on the selected prioritization. For example, the governmental vehicles (i.e., identified with a "G") have been given the highest priority. As shown in FIG. 12, these government vehicles are arranged within the center of barricade 1210, including autonomous government passenger vehicle 1030, autonomous government truck 1040, and autonomous government passenger vehicle 1050. That is, these vehicles are configured to absorb or bear the brunt of potential damage from the imminent threat.

Similarly, the next most prioritized group of vehicles are volunteer vehicles (i.e., identified with a "V"). Accordingly, these vehicles are arranged next to or near the government vehicles. For example, as shown in FIG. 12, autonomous volunteer truck 1020 is located at the front of barricade 1210 along one side near second building 132 and other volunteer vehicles are also arranged near the sides of barricade 1210. Additionally, the remaining autonomous vehicles that will be used to form barricade 1210 are arranged along the outermost edges of barricade (i.e., near second building 132 and third building 134). With this arrangement, barricade 1210 is configured to absorb the impact from the imminent threat to stop and/or restrain the imminent threat from proceeding past barricade area 150 on road 120.

Additionally, as shown in FIG. 12, the autonomous vehicles which are determined to be occupied (as indicated by a face icon) according to any of the techniques described above are not used to form the barricade at barricade area 150. For example, in contrast with the other autonomous vehicles shown in FIG. 12, occupied autonomous vehicle 740 remains parked near third building 134 and does not move towards barricade area 150. Other occupied autonomous vehicles similarly remain in their initial positions and are not used to form barricade 1210. As described above, in some embodiments, these occupied vehicles may receive a warning or alert of the incoming imminent threat.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for deploying autonomous vehicles to form a barricade, the method comprising:
   determining at least one location for a barricade;
   determining a plurality of autonomous vehicles that are available to form the barricade;
   determining whether each autonomous vehicle of the plurality of autonomous vehicles is occupied or unoccupied;
   upon determining that an autonomous vehicle of the plurality of autonomous vehicles is occupied, excluding the occupied autonomous vehicle for use in forming the barricade;
   upon determining that an autonomous vehicle of the plurality of autonomous vehicles is unoccupied, including the unoccupied autonomous vehicle for use in forming the barricade;
   sending instructions to one or more of the unoccupied autonomous vehicles of the plurality of autonomous vehicles to form the barricade at the at least one location; and
   wherein, in response to the instructions, the one or more of the unoccupied autonomous vehicles of the plurality of autonomous vehicles are configured to move to the at least one location and form the barricade.

2. The method according to claim 1, wherein determining the at least one location for the barricade is based on information associated with an imminent threat.

3. The method according to claim 1, wherein the plurality of autonomous vehicles coordinate their movements at the at least one location to form the barricade across a road.

4. The method according to claim 1, wherein determining the plurality of autonomous vehicles that are available to form the barricade includes using at least one factor to create a prioritized list of autonomous vehicles.

5. The method according to claim 4, wherein the least one factor includes one or more of whether the autonomous vehicle is a governmental or municipal vehicle, whether the autonomous vehicle is approved for use, a value of the autonomous vehicle, or a size of the autonomous vehicle.

6. The method according to claim 4, wherein a configuration of the barricade is based on the prioritized list.

7. The method according to claim 6, wherein autonomous vehicles having a higher priority on the prioritized list are arranged in a center portion of the barricade.

8. The method according to claim 1, wherein determining that an autonomous vehicle of the plurality of autonomous vehicles is occupied includes receiving or analyzing data from the autonomous vehicle that indicates or infers that the autonomous vehicle is occupied.

9. A method for detecting an imminent threat and deploying autonomous vehicles to form a barricade, the method comprising:
   receiving information associated with an imminent threat;
   determining a route for the imminent threat, the route including at least one road;
   determining, based on the route for the imminent threat, at least one location for a barricade on the at least one road;
   determining a plurality of autonomous vehicles that are available to form the barricade;
   receiving or analyzing data from the plurality of autonomous vehicles to determine whether each autonomous vehicle of the plurality of autonomous vehicles is occupied or unoccupied; and
   deploying one or more unoccupied autonomous vehicles of the plurality of autonomous vehicles to form the barricade at the at least one location and excluding all occupied autonomous vehicles of the plurality of autonomous vehicles from being used to form the barricade.

10. The method according to claim 9, wherein receiving information associated with the imminent threat includes at least one of detecting an uncontrolled vehicle, receiving a report from authorities, or detecting a vehicle being operated in an unsafe manner.

11. The method according to claim 9, further comprising:
    determining whether the barricade was successful in stopping or restraining the imminent threat; and
    upon determining that the barricade was not successful, determining at least one second location to form a barricade.

12. The method according to claim 9, further comprising:
    sending instructions to the one or more unoccupied autonomous vehicles of the plurality of autonomous vehicles to form the barricade at the at least one location on the road; and
    wherein, in response to the instructions, the one or more unoccupied autonomous vehicles of the plurality of autonomous vehicles are configured to move to the at least one location and form the barricade.

13. The method according to claim 9, wherein determining the plurality of autonomous vehicles that are available to form the barricade includes using at least one factor to create a prioritized list of autonomous vehicles.

14. The method according to claim 13, wherein the least one factor includes one or more of whether the autonomous vehicle is a governmental or municipal vehicle, whether the autonomous vehicle is approved for use, a value of the autonomous vehicle, or a size of the autonomous vehicle.

15. The method according to claim 13, wherein a configuration of the barricade is based on the prioritized list.

16. A system for deploying autonomous vehicles to form a barricade, the system comprising:
- a plurality of autonomous vehicles;
- a server including a processor in communication with the plurality of autonomous vehicles via a communication network;
- wherein the processor of the server is configured to:
  - determine at least one location for a barricade;
  - determine the autonomous vehicles of the plurality of autonomous vehicles that are available to form the barricade;
  - determine whether each autonomous vehicle of the plurality of autonomous vehicles is occupied or unoccupied;
  - upon determining that an autonomous vehicle of the plurality of autonomous vehicles is occupied, exclude the occupied autonomous vehicle for use in forming the barricade;
  - upon determining that an autonomous vehicle of the plurality of autonomous vehicles is unoccupied, include the unoccupied autonomous vehicle for use in forming the barricade;
  - send instructions to the available unoccupied autonomous vehicles to form the barricade at the at least one location and exclude all occupied autonomous vehicles from being used to form the barricade; and
- wherein, in response to the instructions, the available unoccupied autonomous vehicles are configured to move to the at least one location and form the barricade.

17. The system according to claim 16, wherein the processor of the server is configured to determine the at least one location for the barricade based on information associated with an imminent threat.

18. The system according to claim 16, wherein the available autonomous vehicles are configured to coordinate their movements at the at least one location to form the barricade across a road.

19. The system according to claim 16, wherein the processor of the server is configured to determine the available autonomous vehicles using at least one factor to create a prioritized list of autonomous vehicles to form the barricade.

20. The system according to claim 19, wherein a configuration of the barricade is based on the prioritized list.

* * * * *

UNITED STATES PATENT AND TRADEMARK OFFICE
CERTIFICATE OF CORRECTION

PATENT NO. : 11,556,134 B1
APPLICATION NO. : 17/103591
DATED : January 17, 2023
INVENTOR(S) : Ravi Durairaj et al.

It is certified that error appears in the above-identified patent and that said Letters Patent is hereby corrected as shown below:

On the Title Page

Item [54] and In the Specification Column 1 Line 1 "Automous" is replaced with --Autonomous--

Signed and Sealed this
Fourteenth Day of March, 2023

Katherine Kelly Vidal
*Director of the United States Patent and Trademark Office*